(12) United States Patent
Utsumi et al.

(10) Patent No.: US 7,400,076 B2
(45) Date of Patent: Jul. 15, 2008

(54) ROTATING ELECTRIC MACHINE AND METHOD AND DEVICE FOR POSITIONING ROTATIONAL POSITION SENSOR FOR THE MACHINE

(75) Inventors: Yoshinobu Utsumi, Tokyo (JP); Shinji Nishimura, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/474,418

(22) Filed: Jun. 26, 2006

(65) Prior Publication Data

US 2006/0238040 A1     Oct. 26, 2006

Related U.S. Application Data

(62) Division of application No. 10/620,701, filed on Jul. 17, 2003, now Pat. No. 7,095,145.

(30) Foreign Application Priority Data

Aug. 6, 2002     (JP) ............................ P2002-228531

(51) Int. Cl.
*H02K 1/22* (2006.01)
(52) U.S. Cl. ..................... 310/263; 310/263; 310/43; 310/261; 310/68 B (58) Field of Classification Search ............... 310/43, 310/261, 68 B
See application file for complete search history.

(56) References Cited

U.S. PATENT DOCUMENTS 3,614,577 A     10/1971   Honeywell et al.
6,373,155 B1 *   4/2002   Shimizu et al. ........... 310/68 B

FOREIGN PATENT DOCUMENTS

JP     2001-128484 A     5/2001
JP     2002-84724 A      3/2002
JP     2002-186239 A     6/2002

* cited by examiner

*Primary Examiner*—Darren Schuberg
*Assistant Examiner*—Iraj A Mohandesi
(74) *Attorney, Agent, or Firm*—Sughrue Mion, PLLC (57) ABSTRACT

The rotating electric machine has a stator coil wound around a stator, a magnetic pole and a signal rotor fixed to a rotor, and a detection stator, disposed opposite to the signal rotor, for detecting the rotational position of the rotor, characterized by further comprising an adjuster for adjusting the position of the signal rotor or the detection stator by supplying a direct current to a predetermined phase of the stator coil and then a direct current to a different phase from the predetermined phase to rotate the rotor by a predetermined angle or more and constrain the rotor.

3 Claims, 6 Drawing Sheets

ROTATING ELECTRIC MACHINE AND METHOD AND DEVICE FOR POSITIONING ROTATIONAL POSITION SENSOR FOR THE MACHINE

This is a divisional of application Ser. No. 10/620,701 filed Jul. 17, 2003, now U.S. Pat. No. 7,095,145. The entire disclosure of the prior application is considered part of the disclosure of the accompanying divisional application and is hereby incorporated by reference.

BACKGROUND OF THE INVENTION

1. Field of the Invention

The present invention relates to a rotating electric machine having a rotational position sensor, and a method and device for positioning the rotational position sensor.

2. Description of the Related Art

A conventional device has been disclosed in JP-A-2002-186239. This conventional device is a brushless motor in which a detection rotor and a rotation axis are provided separately, and the detection rotor is fixed to the rotation axis by an instantaneous adhesive. Also, a method for assembling the brushless motor is disclosed, including fitting the detection rotor with a play to be relatively rotatable around the rotation axis, stopping a driving rotor at a predetermined position by continually supplying a direct current to a partial phase of a driving coil, tentatively deciding the position of the detection rotor by visual inspection so that the relative position between the detection rotor and the detection stator may fall within a tolerance range, generating an electromagnet action by continually supplying a direct current to a partial phase of an output coil, modifying the relative position between the detection rotor and the detection stator to be in a predetermined position by the movement of the detection rotor based on this electromagnet action, fixing the detection rotor to the rotation axis, and ceasing the supply of direct current to the driving coil and the output coil after completion of fixing.

The conventional brushless motor and the method for assembling the brushless motor are not suitable for the rotating electric machine for vehicle that is subjected to severe vibration and heat, because the detection rotor is fixed to the rotation axis by instantaneous adhesive. The driving rotor is stopped at a predetermined position by continually supplying a direct current to a partial phase of the driving coil, but actually, owing to a rotational friction force of bearings rotatably supporting the rotation axis as well as a rotational friction force produced in a structure in which a brush is rubbed against a slit ring fixed to the rotation axis such as an alternator for vehicle, the driving rotor can not be stopped at the predetermined intrinsic position accurately and stably simply by continually supplying a direct current to a partial phase of the driving coil, resulting in a problem that the rotational position sensor has a poor positioning precision, and the rotating electric machine has a degraded or insufficient performance. Moreover, there is another problem that the step of positioning is lengthened, and it in unsuitable for automation.

SUMMARY OF THE INVENTION

The invention was developed to solve the foregoing problems. An object of the invention is to provide a rotating electric machine, and a method and device for positioning a rotational position sensor for the rotating electric machine, in which the rotating electric machine has an excellent performance by making the positioning precision of the rotational position sensor stable and enhanced, and has an excellent productivity by making the positioning of the rotational position sensor at high precision.

In the rotating electric machine according to this invention, an adjuster for adjusting the position of a signal rotor or the detection stator is provided by energizing the stator coil to rotate the rotor by a predetermined angle or more and constrain the rotor.

Also, the controller generates a correction value by comparing the detection result from the detection stator and the beforehand stored detection data, and controls energizing the stator coil based on this correction value, when the rotor is rotated by predetermined angle or more and constrained by energizing the stator coil.

Also, the rotor rotates to the predetermined angle or more by supplying a direct current to a predetermined phase of the stator coil and then a direct current to a different phase from the predetermined phase.

A method for positioning a rotational position sensor for a rotating electric machine according to this invention includes a step of constraining the rotor from rotating by energizing the stator coil, a step of detecting the rotor to be rotated by a predetermined angle or more, and a step of adjusting the position of the detection stator or the signal rotor so that the detection stator may have a predetermined signal.

Also, a method for positioning a rotational position sensor for a rotating electric machine may include a step of fixing the magnetic pole iron core and the signal rotor in a predetermined positional relation in a rotational direction, a step of constraining the rotor from rotating by energizing the stator coil and the field coil, a step of detecting the rotor to be rotated by a predetermined angle or more, and a step of adjusting the position of the detection stator so that the detection stator may have a predetermined signal.

Also, the method is characterized in that the magnetic pole iron core is a claw pole.

Moreover, a method for positioning a rotational position sensor for a rotating electric machine may include a step of fixing the magnetic pole and the signal rotor in a predetermined positional relation in a rotational direction, a step of constraining the rotor from rotating by energizing the stator coil, a step of detecting the rotor to be rotated by a predetermined angle or more, and a step of adjusting the position of the detection stator so that the detection stator may have a predetermined signal.

Also, the method is characterized in that the step of constraining the rotor from rotating by energizing the stator coil includes rotating the rotor by the predetermined angle by supplying a direct current to a predetermined phase of the stator coil and then a direct current to a different phase from the predetermined phase and constraining the rotor from rotating.

Also, the method is characterized in that the rotational position sensor is a resolver.

Also, the rotational position sensor may be a resolver of one phase excitation and two phase output, wherein the position of the detection stator or the signal rotor is adjusted so that one of the output signals may be zero.

Also, the method is characterized in that the rotating electric machine has n pole pairs, wherein the position of the detection stator or the signal rotor is adjusted so that the average value of n outputs from the detection stator may be zero, when the rotor is constrained at n positions from rotating by energizing the stator.

Further, a device for positioning a rotational position sensor for a rotating electric machine is characterized by comprising a fixing unit for fixing the magnetic pole iron core and the signal rotor in a predetermined positional relation in a rotational direction, a constraining unit for constraining the rotor from rotating by energizing the stator coil and the field coil, a detector for detecting the rotor to be rotated by a predetermined angle or more, and an adjuster for adjusting the position of the detection stator so that the detection stator may have a predetermined signal.

Also, a device for positioning a rotational position sensor for a rotating electric machine is characterized by including a fixing unit for fixing the magnetic pole and the signal rotor in a predetermined positional relation in a rotational direction, a constraining unit for constraining the rotor from rotating by energizing the stator coil, a detector for detecting the rotor to be rotated by a predetermined angle or more, and an adjuster for adjusting the position of the detection stator so that the detection stator may have a predetermined signal.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

First Embodiment

Figure 1:
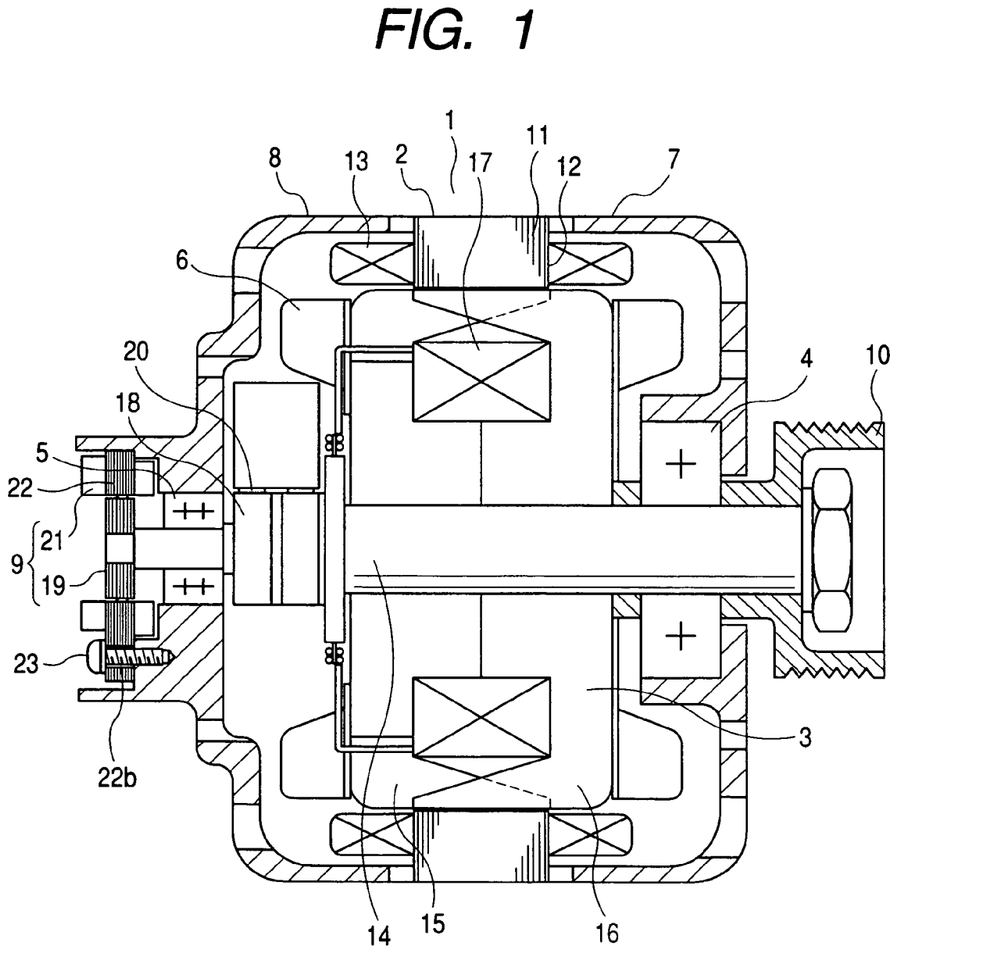
FIG. 1 is a cross-sectional view showing the constitution of a motor generator according to a first embodiment of the present invention.
Figure 2:
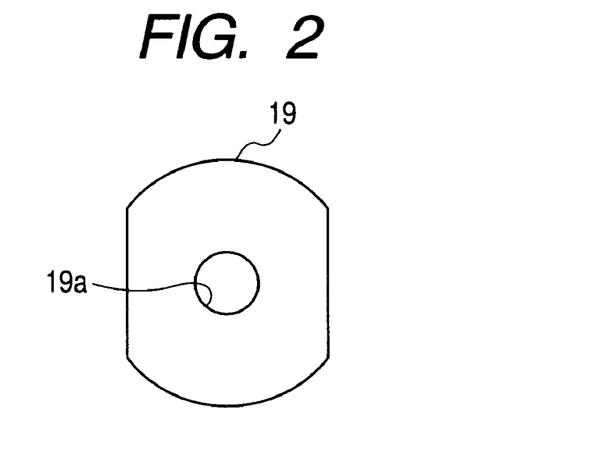
FIG. 2 is a front view showing a signal rotor according to the first embodiment of the invention.
Figure 3A:
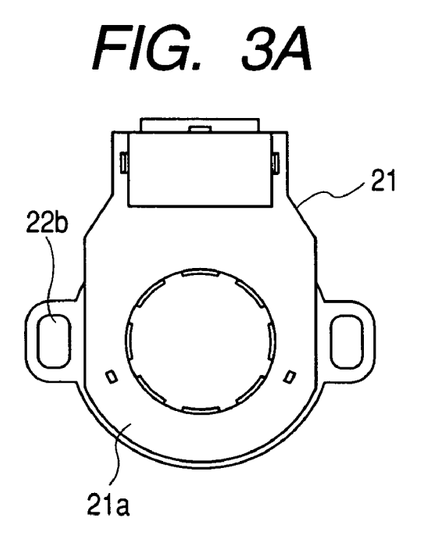
FIGS. 3A and 3B are front views showing a detection stator and a sensor core according to a first embodiment of this invention.
Figure 3B:
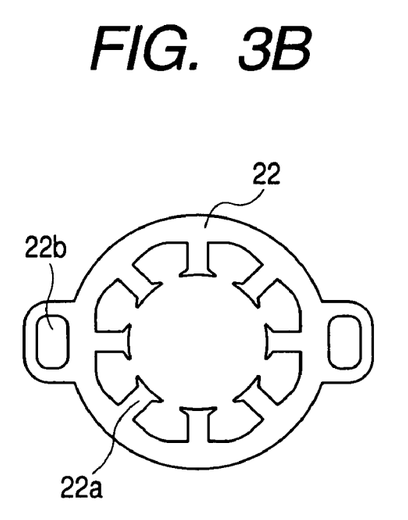
Figure 4:
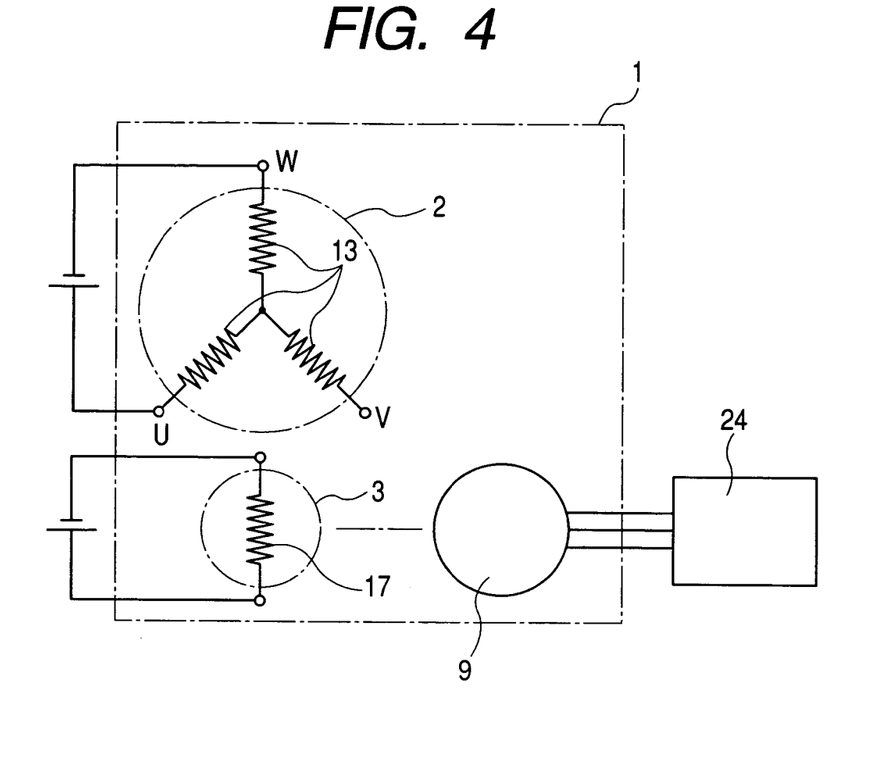
FIG. 4 is an explanatory view for the position adjustment of the rotational position sensor according to the first embodiment of this invention.
Figure 5:
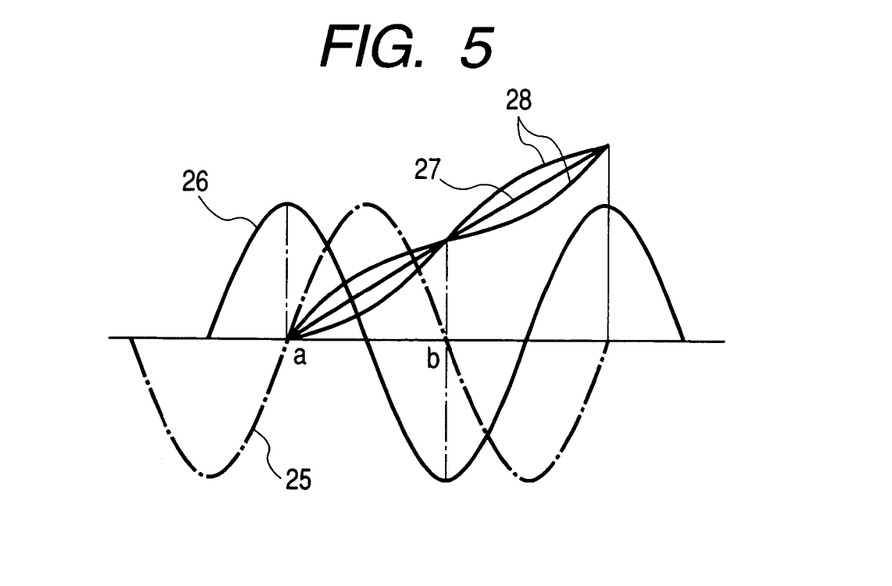
FIG. 5 is an explanatory view for the position adjustment of a resolver according to a first embodiment of this invention.

An first embodiment of the present invention will be described below with reference to the drawings. The same or like part are designated by the same numerals throughout the figures. FIG. 1 is a cross-sectional view showing the constitution of a motor generator, FIG. 2 is a front view showing a signal rotor, FIGS. 3A and 3B are front views showing a detection stator and a sensor core, FIG. 4 is an explanatory view for explaining the position adjustment of a rotational position sensor, and FIG. 5 is an explanatory view for explaining the position adjustment of a resolver. In the figures, reference numeral 1 denotes the motor generator for a vehicle that is a rotating electric machine, including a stator 2 and a rotor 3, the bearings 4 and 5 rotatably supporting the rotor 3, a front bracket 7 and a rear bracket 8 accommodating the stator 2, the rotor 3 and a brush holder 6, a rotational position sensor 9 for detecting the rotational position of the rotor 2, and a pulley 10 for transmitting a turning force.

The stator 2 includes a stator iron core 11 having electromagnetic steel plates laminated, and a stator coil 13 disposed in slots 12 provided in this stator iron core 11. The motor generator 1 for a vehicle has ninety six slots 12, in which the stator coil 13 is in the three phase Y-connection.

The rotor 3 has a rotation axis 14, which is fixed with the claw poles 15 and 16 for the magnetic pole iron core and the field coil 17, making up the sixteen magnetic poles, a slip ring 18 for feeding the field coil 17 with power, and a signal rotor 19 for the rotational position sensor 9. Also, a brush 20 provided for the brush holder 6 is rubbingly pressed against the outer circumferential face of the slip ring 18 by a spring and feeds the field coil 17 via the slip ring 18 from a brush 20.

A detection stator 21 disposed on the rear bracket 8 and the signal rotor 19 fixed to the rotation axis 14 constitute a resolver that is the rotational position sensor 9. FIG. 2 shows the signal rotor 19 having electromagnetic steel plates laminated, with a hole portion 19a for press fitting the rotation axis 14. The signal rotor 19 is press fit into the claw poles 15 and 16 by a jig so as to be placed in a predetermined rotational relation in the rotational direction. As shown in FIGS. 3A and 3B, a sensor core 22 is made by laminating the electromagnetic steel plates, and has teeth 22a and long holes 22b. A one-phase excitation coil and a two-phase output coil are wound around the teeth 22a, and covered with a resin cover 21a such as resin, whereby the detection stator 21 is constituted. The detection stator 21 is fixed by inserting an adjusting screw 23 through the long hole 22b and tightening it against the rear bracket 8.

The position adjustment for the detection stator 21 will be described below. In FIG. 4, if a direct current is supplied across WU of the stator coil 13 and through the field coil 17, the rotor 3 is electrically constrained at a predetermined position with respect to the stator 2 with an electromagnetic force of both the stator coil and the field coil. Then, if a direct current is supplied across UV of the stator coil 13 and through the field coil 17, the rotor 3 is rotated by a predetermined angle with an electromagnetic force of both the stator coil and the field coil, and electrically constrained at a predetermined position with respect to the stator 2. The rotation of the rotor 3 by the predetermined angle is detected on the basis of a signal from the detection stator 21. In this state, the long hole 22b of the detection stator 21 is rotated in a rotation direction referring to a monitor 24 so that the signal from the detection stator 21 may have a predetermined value, and the adjusting screw 23 is tightened, whereby the adjuster is constituted.

Next, the position adjustment for the resolver will be described below. In FIG. 5, of the two-phase output signals from the resolver, 25 is an SIN waveform and 26 is a COS waveform. 27 is a resolver waveform synthesized by both the SIN and COS waveforms. The resolver waveform 27 has a tolerance range 28, as shown in FIG. 5. The long hole 22b of the detection stator 21 is rotated in the rotational direction so that one of the output signals may be zero, like at point a or b in FIG. 5, and then the adjusting screw 23 is tightened.

The operation will be described below. If a field current is supplied from the brush 20 via the slip ring 18 to the field coil 17, the claw poles 15 and 16 of the rotor 3 become the magnetic poles. In this state, if a three-phase alternating current is supplied to the stator coil 13 according to the rotational position sensor 9, a turning force is generated in the rotor 3, which operates as an electric motor. The turning force is transmitted via the rotation axis 14, the pulley 10 and a belt, not shown, to the engine side, so that the engine is started. If the engine is started, the rotor 3 is driven by a torque of the engine, so that the stator coil 13 generates a three-phase alternating current that is rectified to charge a battery, and thereby operates as a generator.

The rotating electric machine as above described is provided with the adjuster for adjusting the position of the signal rotor 19 or the detection stator 21 by energizing the stator coil 13 to rotate the rotor 3 by a predetermined angle or more and constrain it. Therefore, the rotor 3 is easily constrained, positioned at the predetermined intrinsic position stably under less influence of a rotational friction force, and easily adjusted, whereby the rotating electric machine has an excellent performance and stable and high adjustment precision.

If an electric current for energization is increased, the rotor 3 is generally prone to be constrained at the predetermined intrinsic position. Since the position of the rotor 3 is distributed at any position in the rotational direction, the rotor 3 is scarcely moved under the influence of rotational friction force by energization, when the rotor 3 is slightly off the predetermined intrinsic position, whereby the rotor 3 can not be constrained stably at high precision. However, in this invention, since the rotor 3 is rotated by predetermined angle or more and constrained, the rotor 3 is constrained stably at high precision. By the experiments, it has been confirmed that the positioning error is reduced to several to several tens percent for the same energizing current. With the same positioning precision kept, the invention has the effect that reduces the energizing current.

The number of magnetic poles, the number of slots and the rotational friction force are varied according to the specification of the rotating electric machine, and the magnitude of current to energize the stator coil 13 and the field coil 17 can be also set arbitrarily. Hence, the energizing current and the predetermined angle are decided by confirming the relation between the magnitude of energizing current and the rotation angle of the rotor 3 with the positioning precision in advance. In this manner, the rotor 3 is rotated by predetermined angle or more and constrained by supplying a certain current, whereby the predetermined positioning precision is kept. According to this invention, the stable positioning can be made at high precision by rotating the rotor 3 by predetermined angle or more.

Since the stator coil 13 is energized by supplying a direct current to a predetermined phase of the stator coil 13 and then to a different phase to rotate the rotor 3 by predetermined angle or more, the rotor 3 is rotated by predetermined angle or more simply and reliably at high positioning precision, whereby the rotating electric machine is superior in the respect of performance and assembling.

The positioning method includes a step of constraining the rotor 3 from rotating by energizing the stator coil 13, a step of detecting the rotor 3 to be rotated by a predetermined angle or more, and a step of adjusting the position of the detection stator 21 or the signal rotor 19 so that the detection stator 21 may have a predetermined signal, whereby the method for positioning the rotational position sensor for the rotating electric machine is made through a simple process, with high positioning precision and excellent productivity. Though a rotary detector may be linked to the rotation axis 14 to detect that the rotor 3 is rotated by predetermined angle or more, it is possible to simply detect that the rotor 3 is rotated by predetermined angle or more on the basis of a signal from the detection stator 21. Also, the step of detecting the rotor 3 to be rotated by predetermined angle or more may be omitted in case of energizing the stator coil 13 by supplying a direct current to a predetermined phase of the stator coil 13 and then to a different phase from the predetermined phase.

The positioning method includes a step of fixing the magnetic pole iron core 15 and the signal rotor 19 in a predetermined positional relation in the rotational direction, a step of constraining the rotor 3 from rotating by energizing the stator coil 13 and the field coil 17, a step of detecting the rotor 3 to be rotated by a predetermined angle or more, and a step of adjusting the position of the detection stator 21 so that the detection stator 21 may have a predetermined signal, whereby the rotor 3 is reliably constrained with a smaller current because the polarity of the magnetic pole iron core 15 is decided, and the method for positioning the rotational position sensor for the rotating electric machine through a simple process, with high positioning precision and excellent productivity can be obtained. Since the signal rotor 19 is press fit into the claw poles 15 and 16 by a jig so as to be placed in a predetermined rotational relation in the rotational direction, the position of the detection stator 21 is easily adjusted, the long hole 22b is shortened, and the device is miniaturized. Also, the signal rotor 19 is superior in the vibration resistance and heat resistance owing to press fitting.

The claw poles 15 and 16 are produced by forging, and employed in combination, thereby having a peculiar assembling error. However, according to this invention, the rotor 3 is constrained at an average position by energization, with enhanced positioning precision.

Since the step of constraining the rotor 3 from rotating by energizing the stator coil 13 includes supplying a direct current to a predetermined phase and then to a different phase to rotate the rotor 3 by predetermined angle or more and constrain the rotor 3 from rotating, the rotor 3 is rotated by predetermined angle or more simply and reliably, whereby the method for positioning the rotational position sensor for the rotating electric machine through a simple process, with high positioning precision and excellent productivity can be obtained.

Since the rotational position sensor 9 is a resolver, it is possible to obtain a rotational position signal that is excellent in the resolution even when the rotor 3 is in a constrained state. Furthermore, since the resolver has one-phase magnetization and two-phase outputs, the position of the detection stator 21 or the signal rotor 19 is adjusted so that one of the output signals may be zero. Therefore, the method for positioning the rotational position sensor for the rotating electric machine through a simple process, with high adjustment precision and excellent productivity can be obtained.

The positioning device includes a fixing unit for fixing the magnetic pole iron core and the signal rotor 19 in a predetermined positional relation in a rotational direction, a constraining unit for constraining the rotor 3 from rotating by energizing the stator coil 13 and the field coil 17, a detector for detecting the rotor 3 to be rotated by a predetermined angle or more, and an adjuster for adjusting the position of the detection stator 21 so that the detection stator 21 may have a predetermined signal, in which the signal rotor 19 is press fit into the claw poles 15 and 16 by a jig in advance so as to be placed in the predetermined rotational relation in the rotational direction. Hence, the position of the detection stator 21 is easily adjusted in a short time, the rotor 33 is easily constrained by energization with the high positioning precision and the easy position adjustment of the detection stator 21 because detecting means detects the rotor 22 to be rotated by predetermined angle or more, whereby the device for positioning the rotational position sensor for the rotating electric machine is produced through a simple process, with high positioning precision, and is easily automated with excellent productivity.

The positioning device may be provided with a mechanism for mechanically constraining the rotor 3 at a certain position after energizing the stator coil 13 and the field coil 17 to constrain the rotor 3 electrically at the position. Also, in the case where a fixing unit for fixing the magnetic pole iron core and the signal rotor 19 in a certain positional relation in the rotational direction is not provided, it takes comparatively long time to adjust the position of the detection stator 21, or the long hole 22b is larger, but the equivalent positioning precision is obtained, whereby the positioning and position adjusting device is integrally provided.

Second Embodiment

Though in the first embodiment, the position of the detection stator 21 or the signal rotor 19 is adjusted so that one of the output signals from the resolver may be zero, the position of the detection stator 21 or the signal rotor 19 may be adjusted so that the average value of eight outputs from the detection stator 21 may be zero by constraining the rotor 3 from rotating at eight positions for the motor generator 1 with eight pole pairs.

By this adjustment, the adjustment errors due to dispersion in the pole pitch are averaged, whereby the method for positioning the rotational position sensor for the rotating electric machine has excellent adjustment precision and excellent performance. Particularly, this second embodiment is very effective for the rotating electric machine with the claw poles 15 and 16.

Third Embodiment

Figure 6:
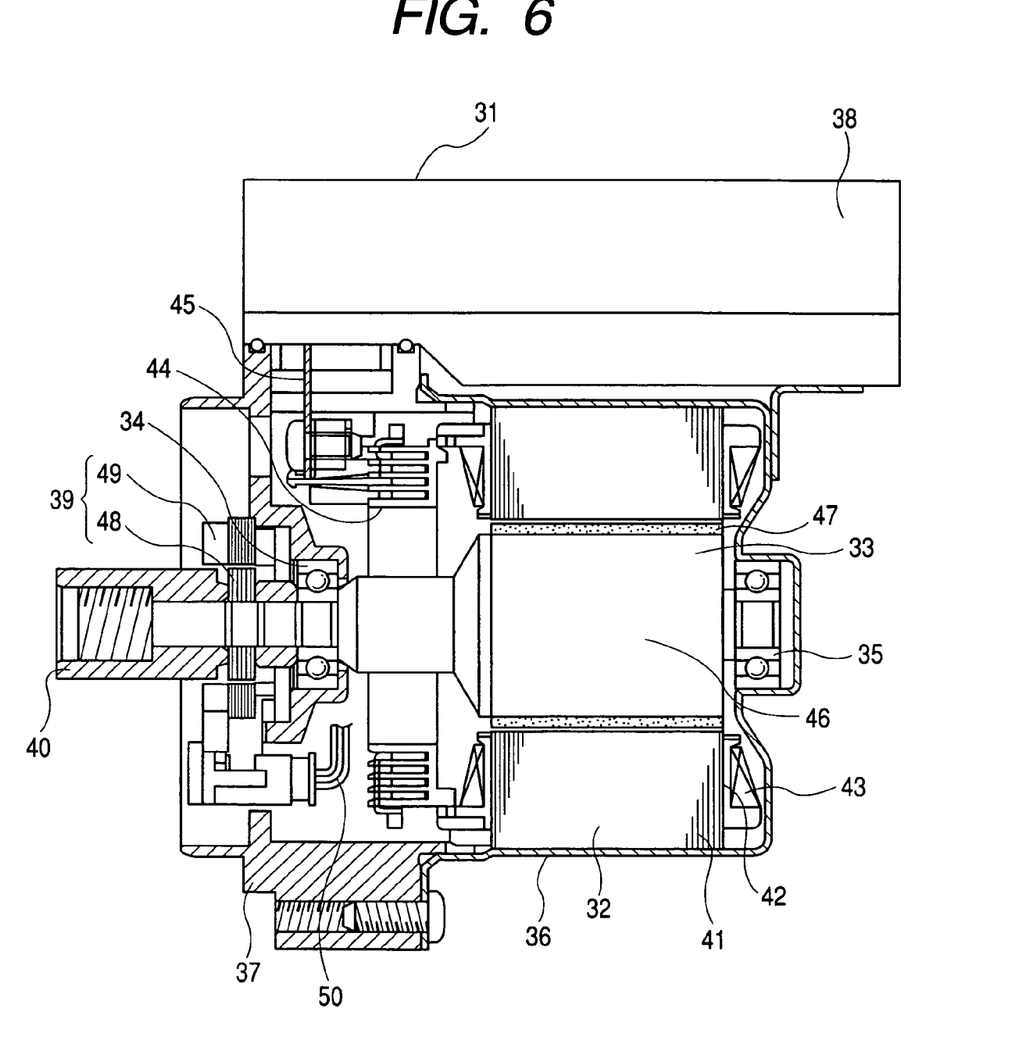
FIG. 6 is a cross-sectional view showing a brushless motor for an electric power steering according to a third embodiment of this invention.
Figure 7:
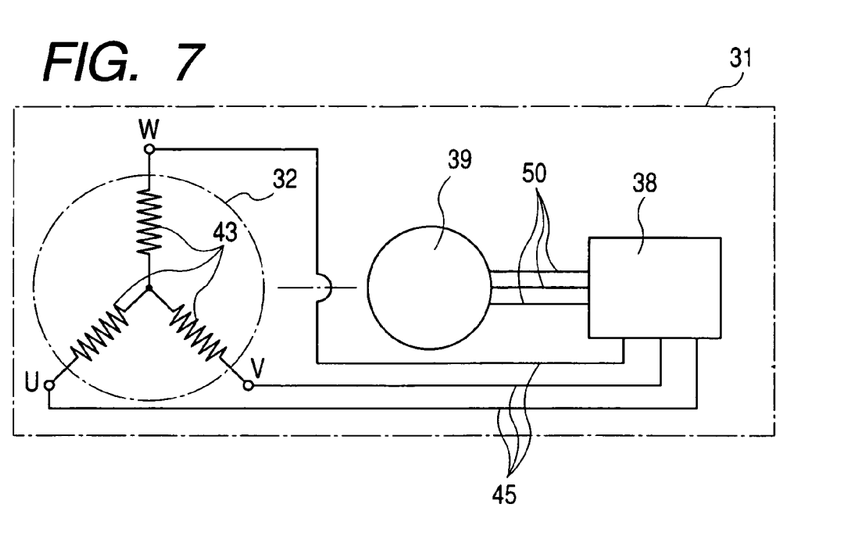
FIG. 7 is a functional block diagram of the brushless motor for the electric power steering according to the third embodiment of this invention.

FIG. 6 is a cross-sectional view showing a brushless motor for an electric power steering according to an third embodiment of this invention, and FIG. 7 is a functional block diagram of the brushless motor. In these figures, reference numeral 31 denotes the brushless motor for the electric power steering constituting the rotating electric machine. The brushless motor 31 includes a stator 32 and a rotor 33, the bearings 34 and 35 for supporting the rotor 33 rotatably, a yoke 36 having the stator 32 press fit into the inner circumferential face and accommodating the stator 32 and the rotor 33 together with a bracket 37, a controller 38 for controlling the brushless motor, a rotational position sensor 39 for detecting the rotational position of the rotor 32, and a boss 40 for transmitting a turning force.

The stator 32 includes a stator iron core 41 having electromagnetic steel plates laminated, and a stator coil 43 laid in a slot 42 provided in this stator iron core 41. This brushless motor 31 has twelve slots 42, in which an end of the stator coil 43 is provided in three-phase Y connection by a terminal 44, and connected via a connector 45 to the controller 38.

The rotor 33 has permanent magnets 47 of eight poles making up the magnetic poles, a signal rotor 48 of the rotational position sensor 39, and a boss 40 for transmitting a turning force, which are fixed around a rotation axis 46 and 40.

A resolver constituting the rotational position sensor 39 includes a detection stator 49 disposed in the bracket 37 and the signal rotor 48 fixed to the rotation axis 46 in the same manner as in the first embodiment. The signal rotor 48 is press fit into the rotation axis 46, and the magnet 47 is magnetized, employing a magnetizing jig with reference to a press fit position of the signal rotor 48. The detection stator 49 is tightly fastened with the bracket 37 by a screw, not shown. A detected result of the detection stator 49 is sent via a signal line 50 to the controller 38.

The position adjustment for the rotational position sensor 39 will be described below. In FIG. 7, the controller 38 supplies a direct current across WU of the stator coil 43, so that the rotor 33 is electrically constrained at the predetermined position with respect to the stator 32 with an electromagnetic force of both the stator 32 and the rotor 33. Subsequently, the controller 38 supplies a direct current across UV of the stator coil 43, the rotor 33 is rotated by a predetermined angle with an electromagnetic force of both the stator 32 and the rotor 33, and electrically constrained at the predetermined position with respect to the stator 32. In this state, the controller 38 compares a signal of detected result from the detection stator 49 with stored detection data acquired in supplying direct current across UV of the stator coil 43 to generate a correction value, and controls the stator coil 43 to be energized on the basis of this correction value. The controller 38 has a power line connected from the battery, and accepts a speed signal and a torque sensor signal.

The operation will be described below. The controller 38 energizes the stator coil 43 according to the detected result of the detection stator 49, in assisting a steering power on the basis of a torque sensor signal. By this energization, the rotor 3 generates a turning force with an electromagnetic force of the stator 32 and the permanent magnet 47, so that the turning force is transmitted via the boss 40 to the steering side to assist the steering power.

In the rotating electric machine as described above, the controller 38 compares the detected result from the detection stator 49 with the stored detected data to generate a correction value and controls the stator coil 43 to be energized on the basis of this correction value, when the rotor 33 is rotated by a predetermined angle or more by energizing the stator coil 43 and constrained, so that the position adjustment for the rotational position sensor 39 is made by the rotating electric machine itself, and less susceptible to a rotational friction force, whereby it is possible to provide the rotating electric machine having a high adjustment precision and stable and excellent performance.

The signal rotor 48 is press fitted into the rotation axis 46, and the magnet 47 is magnetized by employing a magnetizing jig with reference to a press fit position of the signal rotor 48. Hence, the signal rotor 48 and the magnet 47 are superior in the vibration resistance and heat resistance with excellent positional precision, whereby the rotating electric machine is easily adjusted, small in size and has excellent performance.

Though in the third embodiment, the rotating electric machine employs the permanent magnets 47, the rotating electric machine may be constituted as shown in the first embodiment. It is needless to say that the same parts can exhibit the same effects as in the first embodiment.

Fourth Embodiment

Figure 8:
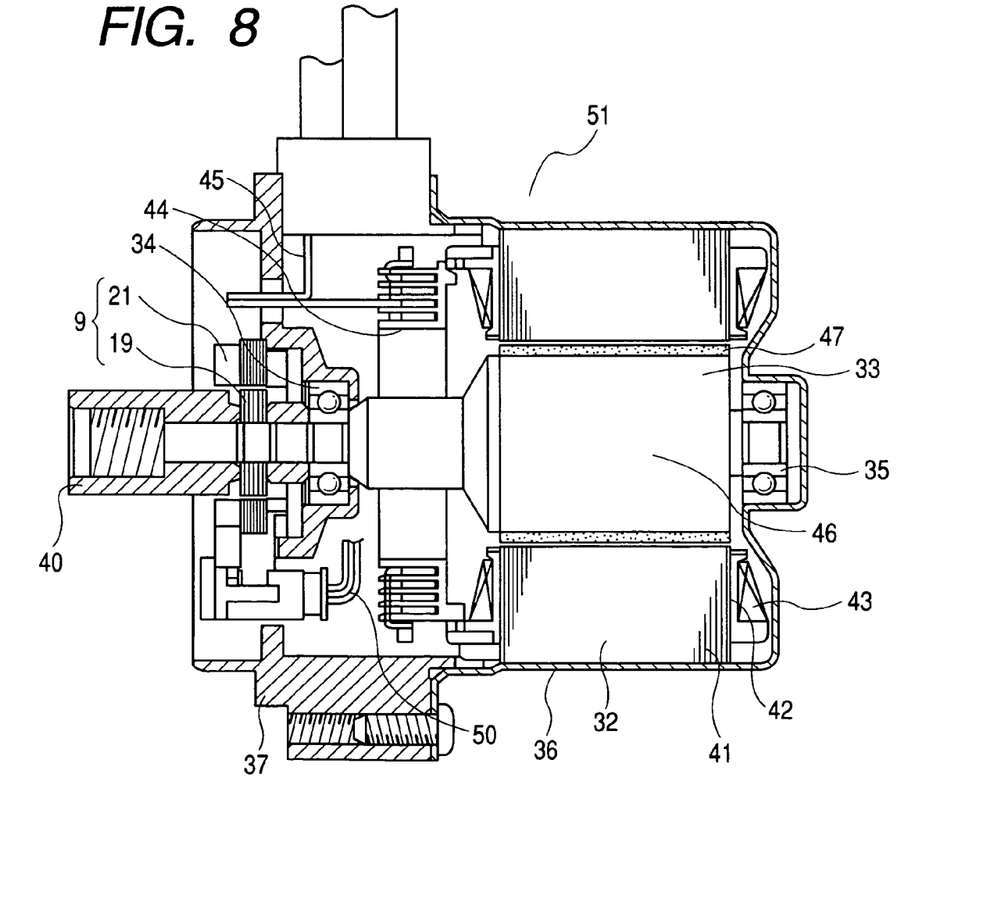
FIG. 8 is a cross-sectional view showing a brushless motor for an electric power steering according to an fourth embodiment of this invention.
Figure 9:
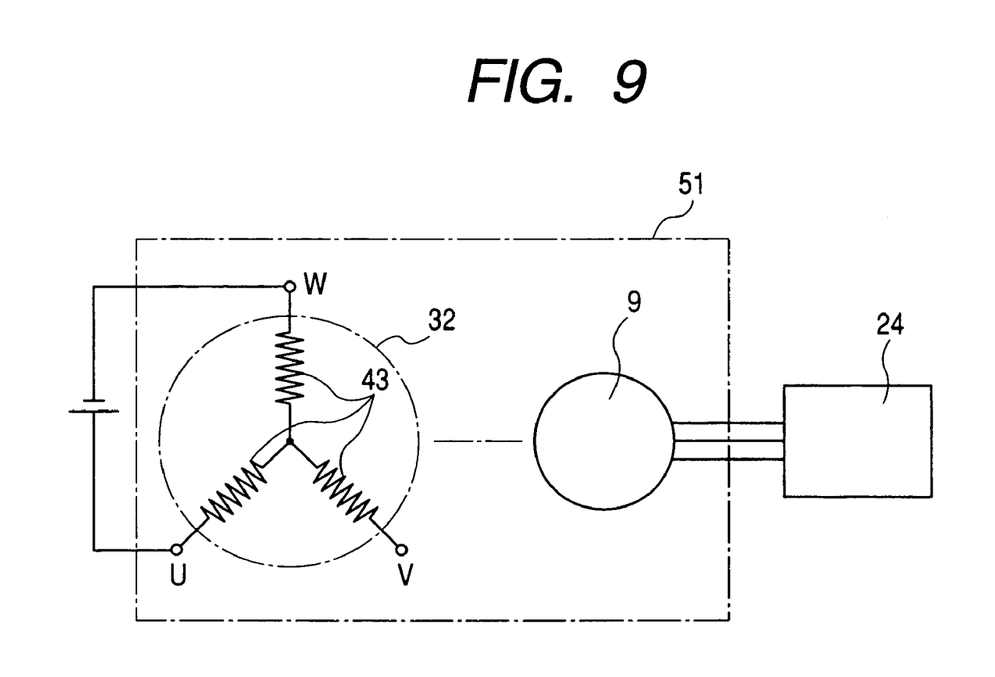
FIG. 9 is an explanatory view for the position adjustment of a rotational position sensor according to a fourth embodiment of this invention.

FIG. 8 is a cross-sectional view showing a brushless motor for an electric power steering according to an fourth embodiment of this invention, and FIG. 9 is an explanatory view for the position adjustment of a rotational position sensor. The brushless motor 51 of FIG. 8 is fixed in such a way that the controller 38 is removed from the brushless motor 31 of FIG. 6 and the connector 45 and the signal line 50 are led outside, and the detection stator 21 has the long hole 22b (not shown) as in the first embodiment, and the adjusting screw 23 (not shown) is tightened through the long hole 22b with the bracket 37. The other constitution is the same as in FIG. 6, in which the same or like parts are designated by the same numerals and not described in detail.

The position adjustment for the detection stator 21 will be described below. In FIG. 9, if a direct current is supplied across WU of the stator coil 43, the rotor 33 is electrically constrained at the predetermined position with respect to the stator 32 with an electromagnetic force of both the stator 32 and the permanent magnet 47. Subsequently, if a direct current is supplied across UV of the stator coil 43, the rotor 33 is rotated by a predetermined angle with the electromagnetic force, and electrically constrained at the predetermined position with respect to the stator 32. It is detected from the signal of the detection stator 21 that the rotor 33 is rotated by predetermined angle. In this state, the long hole 22b of the detection stator 21 is rotated in the rotation direction on the basis of the monitor 24 so that the detection stator 21 may have a predetermined signal, and the adjusting screw 23 is tightened, whereby the adjuster is constituted.

Though the fourth embodiment is constituted as above described, the adjuster for adjusting the position of the signal rotor 48 or the detection stator 21 is provided by energizing the stator coil 43 to rotate the rotor 33 by a predetermined angle or more and constrain it. Therefore, the rotor 33 is positioned at the predetermined intrinsic position stably while being easily constrained under scarce influence of a rotational friction force, and easily adjusted. As a result, the rotating electric machine of excellent performance is obtained with high adjustment precision.

The method includes a step of fixing the magnetic poles 47 and the signal rotor 48 in a predetermined positional relation in the rotational direction, a step of constraining the rotor 33 from rotating by energizing the stator coil 43, a step of detecting the rotor 33 to be rotated by a predetermined angle or more, and a step of adjusting the position of the detection stator 21 so that the detection stator 21 may have a predetermined signal, whereby it is possible to provide the positioning method of the rotational position sensor for the rotating electric machine which is produced through a simple process, and has high positioning precision and excellent productivity. The signal rotor 48 is press fit into the rotation axis 46, and the magnet 47 is magnetized, By employing a magnetizing jig with reference to a press fit position of the signal rotor 48. Hence, the positioning precision of both is excellent, the position adjustment for the detection stator 21 is easily made, the long hole 22b is shortened, and the device is miniaturized. Also, the signal rotor 19 is superior in the vibration resistance and heat resistance due to press fitting.

The positioning device includes a fixing unit for fixing the magnetic poles 47 and the signal rotor 48 in a predetermined positional relation in a rotational direction, a constraining unit for constraining the rotor 33 from rotating by energizing the stator coil 43, a detector for detecting the rotor 33 to be rotated by a predetermined angle or more, and an adjuster for adjusting the position of the detection stator 21 so that the detection stator 21 may have a predetermined signal, in which the signal rotor 48 is press fit into the rotation axis 46, and the magnet 47 is magnetized by employing a magnetizing jig with reference to a press fit position of the signal rotor 48. Hence, the position of the detection stator 21 is easily adjusted in a short time, the rotor 33 is easily constrained by energization with the high positioning precision and easy position adjustment of the detection stator 21 because detecting means detects the rotor 22 to be rotated by predetermined angle or more, whereby the device for positioning the rotational position sensor for the rotating electric machine is produced through a simple process, has high positioning precision, is easily automated and has excellent productivity.

As described above, according to a first aspect of the invention, there is provided a rotating electric machine having a stator coil wound around a stator, a magnetic pole and a signal rotor fixed to a rotor, and a detection stator, disposed opposite to the signal rotor, for detecting the rotational position of the rotor, characterized by further including an adjuster for adjusting the position of the signal rotor or the detection stator by energizing the stator coil to rotate the rotor by a predetermined angle or more and constrain it. Therefore, the rotating electric machine of excellent performance can be obtained cheaply, because the rotor is easily adjusted under less influence of rotational friction force, with stable and enhanced adjustment precision.

According to a second aspect of the invention, there is provided a rotating electric machine having a stator coil wound around a stator, a magnetic pole and a signal rotor fixed to a rotor, a detection stator, disposed opposite to the signal rotor, for detecting the rotational position of the rotor, and a controller for controlling energizing the stator coil on the basis of a detection result of the detection stator, characterized in that the controller generates a correction value by comparing the detection result from the detection stator and the stored detection data, and controls energizing the stator coil on the basis of the correction value, when the rotor is rotated by a predetermined angle or more and constrained by energizing the stator coil. Therefore, the position adjustment is made by the rotating electric machine itself under less influence of rotational friction force and with stable enhanced adjustment precision, whereby the rotating electric machine of excellent performance is obtained cheaply.

According to a third aspect of the invention, the rotor is rotated by the predetermined angle or more by supplying a direct current to a predetermined phase of the stator coil and then a direct current to a different phase from the predetermined phase. Therefore, the rotor is rotated by predetermined angle or more simply and reliably with high positioning precision, whereby the rotating electric machine that is excellent in respect of performance and assembling is produced.

According to a fourth aspect of the invention, there is provided a method for positioning a rotational position sensor for a rotating electric machine, the rotational position sensor having a stator coil wound around a stator, a rotor having a magnetic pole and a signal rotor fixed to a rotation axis thereof, and a detection stator, disposed opposite to the signal rotor, for detecting the rotational position of the rotor, characterized by including a step of constraining the rotor from rotating by energizing the stator coil, a step of detecting the rotor to be rotated by a predetermined angle or more, and a step of adjusting the position of the detection stator or the signal rotor so that the detection stator may have a predetermined signal. Accordingly, it is possible to provide the positioning method for the rotational position sensor which is produced through a simple process and has high positioning precision and excellent productivity.

According to a fifth aspect of the invention, there is provided a method for positioning a rotational position sensor for a rotating electric machine, the rotational position sensor having a stator coil wound around a stator, a rotor having a magnetic pole iron core with a field coil and a signal rotor fixed to a rotation axis thereof, and a detection stator, disposed opposite to the signal rotor, for detecting the rotational position of the rotor, characterized by including a step of fixing the magnetic pole iron core and the signal rotor in a predetermined positional relation in a rotational direction, a step of constraining the rotor from rotating by energizing the stator coil and the field coil, a step of detecting the rotor to be rotated by a predetermined angle or more, and a step of adjusting the position of the detection stator so that the detection stator may have a predetermined signal. Therefore, it is possible to provide the method for positioning the rotational position sensor which is produced through a simple process and has high positioning precision and excellent productivity, in which the rotor is constrained securely.

According to a sixth aspect of the invention, the magnetic pole iron core is a claw pole. Therefore, the rotor is constrained at an average position against an assembling error peculiar to the claw pole, whereby it is possible to provide the method for positioning the rotational position sensor with high positioning precision.

According to a seventh aspect of the invention, there is provided a method for positioning a rotational position sensor for a rotating electric machine, the rotational position sensor having a stator coil wound around a stator, a rotor having a magnetic pole composed of a permanent magnet and a signal rotor fixed together to a rotation axis thereof, and a detection stator, disposed opposite to the signal rotor, for detecting the rotational position of the rotor, characterized by including a step of fixing the magnetic pole and the signal rotor in a predetermined positional relation in a rotational direction, a step of constraining the rotor from rotating by energizing the stator coil, a step of detecting the rotor to be rotated by a predetermined angle or more, and a step of adjusting the position of the detection stator so that the detection stator may have a predetermined signal. Therefore, it is possible to provide the method for positioning the rotational position sensor which is produced through a simple process and has high positioning precision and excellent productivity.

According to an eighth aspect of the invention, the step of constraining the rotor from rotating by energizing the stator coil includes rotating the rotor by the predetermined angle by supplying a direct current to a predetermined phase of the stator coil and then a direct current to a different phase from the predetermined phase, and constraining the rotor from rotating. Therefore, the rotor is rotated by the predetermined angle simply and reliably, whereby it is possible to provide the method for positioning the rotational position sensor which has excellent productivity.

According to a ninth aspect of the invention, the rotational position sensor is a resolver. Therefore, a rotational position signal having excellent resolution is obtained even when the rotor is constrained, whereby it is possible to provide the method for positioning the rotational position sensor which is produced through a simple process and has high adjustment precision and excellent productivity.

According to a tenth aspect of the invention, the rotational position sensor is a resolver of one phase excitation and two phase output, wherein the position of the detection stator or the signal rotor is adjusted so that one of the output signals may be zero. Therefore, it is possible to provide the method for positioning the rotational position sensor which is produced through a simple process and has high adjustment precision and excellent productivity.

According to an eleventh aspect of the invention, the rotating electric machine has n pole pairs, wherein the position of the detection stator or the signal rotor is adjusted so that the average value of n outputs from the detection stator may be zero, when the rotor is constrained at n positions from rotating by energizing the stator. Therefore, the adjustment errors due to dispersion in the pole pitch are averaged, whereby the method for positioning the rotational position sensor has excellent adjustment precision and excellent performance.

According to a twelfth aspect of the invention, there is provided a device for positioning a rotational position sensor for a rotating electric machine, the rotational position sensor having a stator coil wound around a stator, a rotor having a magnetic pole iron core with a field coil and a signal rotor fixed to a rotation axis thereof, and a detection stator, disposed opposite to the signal rotor, for detecting the rotational position of the rotor, characterized by including a fixing unit for fixing the magnetic pole iron core and the signal rotor in a predetermined positional relation in a rotational direction, a constraining unit for constraining the rotor from rotating by energizing the stator coil and the field coil, a detector for detecting the rotor to be rotated by a predetermined angle or more, and an adjuster for adjusting the position of the detection stator so that the detection stator may have a predetermined signal. The position adjustment is made in a short time, and the positioning device for the rotational position sensor is simple, with high positioning precision, and easily automated, and has excellent productivity.

According to a thirteenth aspect of the invention, there is provided a device for positioning a rotational position sensor for a rotating electric machine, the rotational position sensor having a stator coil wound around a stator, a rotor having a magnetic pole composed of a permanent magnet and a signal rotor fixed to a rotation axis thereof, and a detection stator, disposed opposite to the signal rotor, for detecting the rotational position of the rotor, characterized by including a fixing unit for fixing the magnetic pole and the signal rotor in a predetermined positional relation in a rotational direction, a constraining unit for constraining the rotor from rotating by energizing the stator coil, a detector for detecting the rotor to be rotated by a predetermined angle or more, and an adjuster for adjusting the position of the detection stator so that the detection stator may have a predetermined signal. The position adjustment is made in a short time, and the positioning device for the rotational position sensor is simple, with high positioning precision, and easily automated, and has excellent productivity.

What is claimed is:

1. A rotating electric machine comprising:
   a stator;
   a stator coil wound around the stator;
   a rotor including a magnetic pole;
   a signal rotor fixed to the rotor;
   a detection stator disposed opposite to the signal rotor, for detecting the rotational position of the rotor; and
   an adjuster for adjusting the position of the signal rotor or the detection stator by energizing the stator coil to rotate the rotor by at least a predetermined angle and constrain the rotator.

2. A rotating electric machine comprising:
   a stator;
   a stator coil wound around the stator;
   a rotor including a magnetic pole;
   a signal rotor fixed to the rotor;
   a detection stator disposed opposite to the signal rotor, for detecting the rotational position of the rotor; and
   a controller for controlling energizing the stator coil on the basis of a detection result of the detection stator;
   wherein the controller generates a correction value by comparing the detection result from the detection stator and previously stored detection data, and the controller controls energizing the stator coil on based on the correction value, when the rotor is rotated by at least predetermined angle and constrained by energizing the stator coil.

3. The rotating electric machine according to claim 1, wherein the rotor is rotated by the predetermined angle or more by supplying a direct current to a predetermined phase of the stator coil and then a direct current to a different phase from the predetermined phase.

* * * * *